United States Patent
Brass

(10) Patent No.: US 6,595,039 B2
(45) Date of Patent: Jul. 22, 2003

(54) METHOD OF APPLYING LIQUID FLUORESCENT DYES TO THE INTERNAL PARTS OF AIR CONDITIONING OR REFRIGERATION SYSTEMS

(75) Inventor: Jack Brass, Toronto (CA)

(73) Assignee: Brasscorp Limited (CA)

( * ) Notice: Subject to any disclaimer, the term of this patent is extended or adjusted under 35 U.S.C. 154(b) by 42 days.

(21) Appl. No.: 09/747,186

(22) Filed: Dec. 26, 2000

(65) Prior Publication Data

US 2003/0044523 A1 Mar. 6, 2003

Related U.S. Application Data

(60) Provisional application No. 60/174,917, filed on Jan. 10, 2000.

(51) Int. Cl.$^7$ ................................................ G01M 3/20
(52) U.S. Cl. ........................................................ 73/40.7
(58) Field of Search .......................................... 73/40.7

(56) References Cited

U.S. PATENT DOCUMENTS

| | | | | |
|---|---|---|---|---|
| 2,096,099 A | * | 10/1937 | Gaugler | 73/40.7 |
| 4,938,063 A | * | 7/1990 | Leighley | 73/40.7 |
| 5,167,140 A | * | 12/1992 | Cooper et al. | 73/40.7 |
| 5,357,782 A | * | 10/1994 | Henry | 73/40.7 |
| 5,421,192 A | * | 6/1995 | Henry | 73/40.7 |
| 5,650,563 A | * | 7/1997 | Cooper et al. | 73/40.7 |
| 5,979,226 A | * | 11/1999 | Cavestri et al. | 73/40.7 |
| 6,070,454 A | * | 6/2000 | Cavestri | 73/40.7 |
| RE36,951 E | | 11/2000 | Cooper et al. | 73/40.7 |
| 6,183,663 B1 | * | 2/2001 | Kalley et al. | 73/40.7 |

* cited by examiner

Primary Examiner—Daniel S. Larkin
(74) Attorney, Agent, or Firm—Robert H. Wilkes; Katten Muchin; Zavis Rosenman

(57) ABSTRACT

A method is provided for applying an internal coating to a fluid conduit component before assembly of that component in a fluid circuit. A selected amount of coating material is placed into a measuring device and dispensed into an opening of the component to coat an interior surface of the component. The coating material may be a leak detection dye or other additive that is later dissolved when the component is installed in a system of components such as an air conditioning system. When the system is charged with refrigerant and lubricant, the dye dissolves and may be circulated by the refrigerant and lubricant. If a leak exists in the system, the dye is expressed to indicate the location of a leak site. An apparatus is also provided for applying dye to an interior surface of a component of an air conditioning unit, prior to assembly of the component in an air conditioning system. The apparatus has a means for placing a selected amount of dye into a measuring device and a means for dispensing the dye into an opening of the component to coat an interior surface of the component.

24 Claims, 3 Drawing Sheets

METHOD OF APPLYING LIQUID FLUORESCENT DYES TO THE INTERNAL PARTS OF AIR CONDITIONING OR REFRIGERATION SYSTEMS

This application claims benefit of Provisional Appln. 60/174,917, filed Jan. 10, 2000.

FIELD OF THE INVENTION

The invention relates to a method and apparatus for applying dyes to the interior surfaces of passageways, such as the passages of air conditioning components.

BACKGROUND OF THE INVENTION

Fluorescent dyes may be used in conjunction with ultraviolet or near ultraviolet lamps to detect refrigerant leaks in air conditioning and refrigeration systems. Typically, when a leak is suspected, dye is injected into the air conditioning system using an injector and a refrigerant charging station to force the dye into the system. Alternatively, dye may be injected using hydraulic devices, such as caulking guns or screw cartridge devices. These devices are used to overcome the internal pressure in the system to force the dye into the air conditioning closed loop unit. Once the dye has been injected into the air conditioning system, it mixes with the refrigerant and lubricating oil of the air conditioner. As the dye dissolves and circulates, it reaches the leak site and escapes from the system with the refrigerant and lubricating oil. An ultraviolet or near ultraviolet lamp may then be used to illuminate the air conditioning system. When ultraviolet light contacts the escaped dye, the dye fluoresces to indicate the location of a leak.

In the manufacturing or assembly of an air conditioning system, it is not desirable in the production line process to use the traditional methods described above to inject dye into the air conditioning system. It often takes considerable time for the dye to be distributed throughout the air conditioning system before it is forced out of the system at the leak site. The above methods may also lead to imperfect distribution of the dye within the air conditioning system because the dye is typically introduced to the system at a limited number of access points. Furthermore, spilling and leakage of the dye during injection of the dye into the air conditioning unit may cause false or inaccurate leak indications when the system is later illuminated to search for leaks.

There are known methods of placing fluorescent dye into an air conditioning system during manufacturing or assembly of the air conditioning system. These methods include placing a dye laden substrate, such as felt or a tablet, into a dehydrator or accumulator of the system before assembly. Once the system is assembled, it is evacuated to remove air and moisture, and then charged with refrigerant and lubricant. The dye dissolves in the refrigerant and system lubricant, and when a leak forms, seeps from the system at a leak site. Using this method, the diffusion of dye through the air conditioning system may be inadequate, making leaks more difficult to detect. If a solid dye is used, the dye might not completely dissolve. As a result, the undissolved dye particles might interfere with the operation of the air conditioning unit. In particular, the compressor of the air conditioner may be negatively affected if these undissolved dye particles are introduced into the compressor mechanism. Furthermore, the substrate remains in the system after the dye dissolves, and the continued presence of the substrate may negatively affect the flow of refrigerant through the air conditioning system.

While there are known methods for placing leak indicators in air conditioning systems, it would be advantageous to supply a leak indicator with individual components of the system before assembly in to a larger system. The leak indicator may be in the form of a thin film or coating applied to a portion, or to the entirety of, an internal surface of a component or components.

Based on the foregoing, alternative methods of applying dye to air conditioning components are desirable.

SUMMARY OF THE INVENTION

The invention consists of a method of applying dye to an interior surface of a component of an air conditioning unit, prior to assembly of said component in an air conditioning system. According to one broad aspect of the invention, the method comprises the steps of:

a) placing a selected amount of dye into a measuring device; and b) dispensing said dye into an opening of said component to coat an interior, surface of said component.

According to another broad aspect of the invention, there is provided a method of applying dye to an interior surface of a component of an air conditioning unit, the method comprising the steps of:

a) placing a selected amount of dye into a measuring device; and b) dripping said dye into the component to coat at least part of the interior surface of the component.

According to another broad aspect of the invention, there is provided a method of detecting leaks in an air conditioning unit, the method comprising the steps of:

a) placing a selected amount of dye into a measuring device;

b) dispensing the dye into an opening of the component to coat an interior surface of the component;

c) installing the component in the air conditioning unit;

d) injecting refrigerant and lubricant into the air conditioning unit to dissolve the dye;

e) illuminating the air conditioning unit with ultraviolet light; and f) checking said illuminated air conditioning unit for fluorescing dye, which indicates the location of a leak.

According to yet another broad aspect of the invention, there is provided a method of detecting leaks in an air conditioning unit, the method comprising the steps of:

a) applying an amount of dye to a screen;

b) installing the screen in a conduit of the air conditioning unit;

c) injecting refrigerant and lubricant into the air conditioning unit and dissolving dye in the lubricant;

d) illuminating the air conditioning unit with ultraviolet light; and e) checking the illuminated air conditioning unit for fluorescing dye.

According to yet another broad aspect of the invention, there is provided a method for applying a leak detection dye to an interior surface of an air conditioning component and to introduce said dye into an air conditioning system, the method comprising the steps of:

a) placing a selected amount of dye into a measuring device;

b) dispensing said dye into an opening of said component to coat an interior surface of said component;

c) installing said component into said air conditioning unit;

d) injecting refrigerant and lubricant into said air conditioning unit to dissolve said dye; and e) circulating said refrigerant and lubricant.

According to another broad aspect of the invention, there is provided a method of applying an internal coating to a fluid conduit component before assembly of that component in a fluid circuit, the method comprising the steps of:

a) placing a selected amount of coating material into a measuring device; and b) dispensing said coating material into an opening of said component to coat an interior surface of said component.

According to another broad aspect of the invention, there is provided an apparatus for applying dye to an interior surface of a component of an air conditioning unit, prior to assembly of said component in an air conditioning system, said apparatus having a means for placing a selected amount of dye into a measuring device; and a means for dispensing said dye into an opening of said component to coat an interior surface of said component.

BRIEF DESCRIPTION OF THE DRAWINGS

For a better understanding of the present invention and to show more clearly how it may be carried into effect, reference is now made, by way of example and not of limitation, to the accompanying drawings in which.

DETAILED DESCRIPTION OF THE INVENTION

Figure 1:
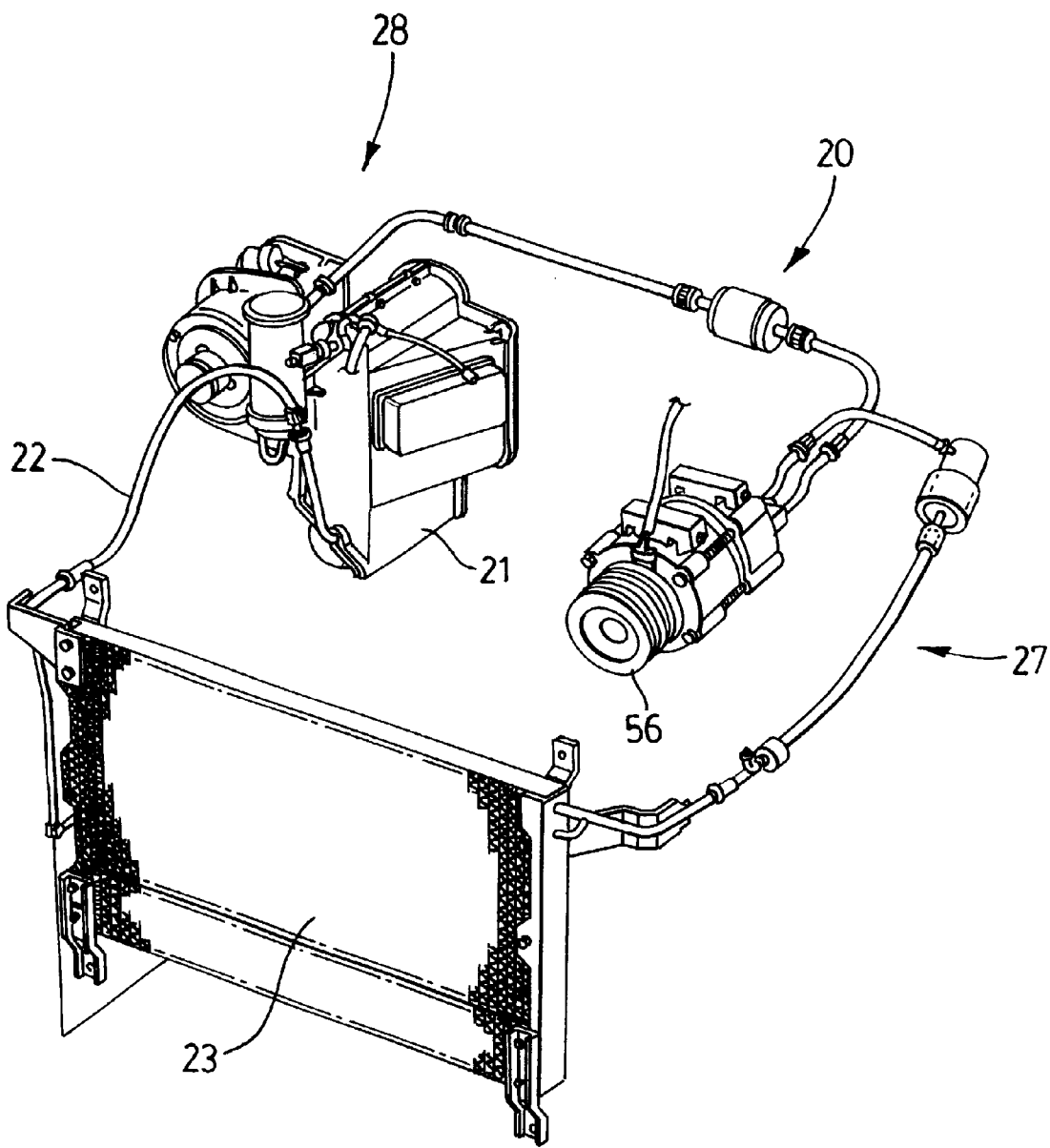
FIG. 1 is a perspective view of a typical air conditioning system.

The description that follows, and the embodiments described therein, are provided by way of illustration of an example, or examples of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

Referring to FIG. 1, the method described herein is intended to be used for coating the interior surfaces of air conditioning components or parts, such as piping or tubing 22, with a dye such as a concentrated liquid fluorescent dye 26, before the air conditioning system or unit 20 is assembled. Any of the other components, such as the evaporator 21, condenser 23, and the internal tubing of the accumulator or receiver-dehydrator, may also be coated using the method in substantially the same manner as described below. The method is not limited to air conditioning systems and may alternatively be applied to the components of other types of piping or refrigeration systems, as well as other systems in which verification of integrity against leaks is a concern.

The method further includes a dye coating method to tend to permit generally efficient and relatively complete even distribution of a dye over the interior surface of an air conditioning component before the component is installed in a larger system. The substantially even distribution of the dye helps the dye to quickly and adequately dissolve in the lubricant of the air conditioning system when the air conditioning system is first charged. The method limits, and preferably eliminates, dripping of the dye from the component after the component is treated with the dye. This may tend to permit the assembly of an air conditioning unit while limiting the possibility of the dye contaminating the exterior surfaces of the components and causing false leak site indications. While the dye may be carried by the refrigerant or the lubricant, it is preferably dissolved in the lubricant.

Air conditioning units are typically assembled, and then evacuated to remove air and moisture. They are then charged with a refrigerant and lubricant, and then put into operation. If the unit fails to operate, or operates inefficiently, a leak of the refrigerant may be the cause. To determine if the air conditioning system has a leak, the system is typically injected with a liquid dye, such as a fluorescent additive, which is compatible with air conditioning systems. The dye is typically completely dissolved in a lubricant such as PAG (polyalkylene glycol) oil, with no residue or solid particles of dye remaining. Since the air conditioning system is pressurized, the dye is circulated and subsequently forced from the system with the refrigerant and lubricant at the site of the leak. An ultraviolet light source, such as a lamp, may then be used to illuminate the air conditioning unit. The ultraviolet light causes the dye to fluoresce, indicating the leak site.

Figure 2:
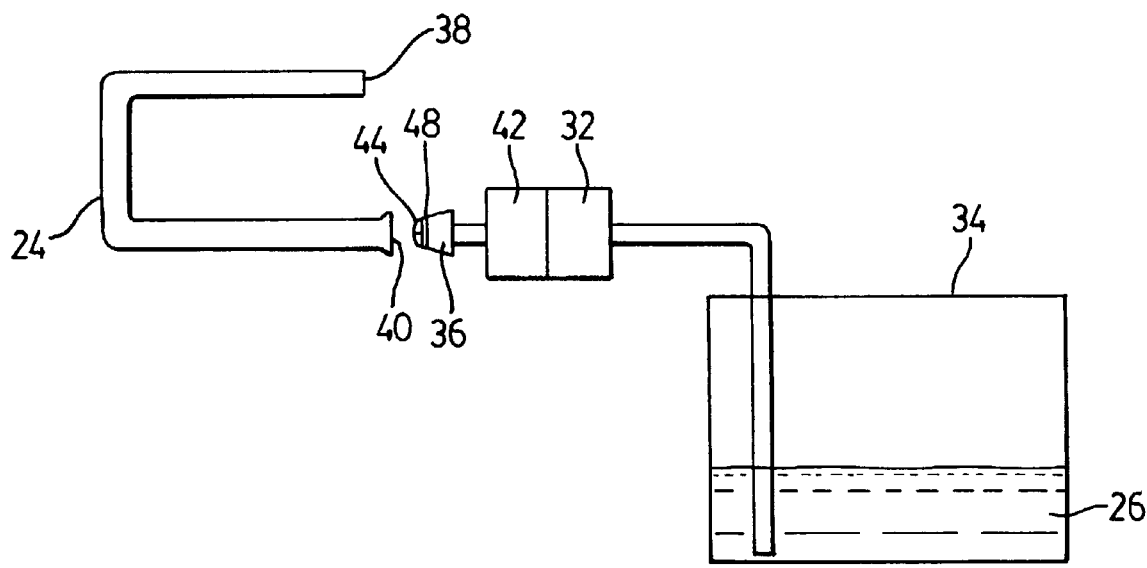
FIG. 2 is a schematic illustration of an apparatus for implementing the method of the present invention.

Referring to FIG. 2, applying a method of the present invention, the mixture of dye 26 and carrier (such as PAG oil) is applied to the interior surfaces of at least one of the components 24 of an air conditioning unit or system 20 before the unit is assembled. While the present examples describe the treatment of a tubular air conditioning component 24, other components may be treated in a similar manner to a similar effect. Dye 26 is preferably applied to at least one air conditioning system component located in the high pressure side 27 of the air conditioning unit 20. In the high pressure side 27, both refrigerant and lubricant are in liquid form making it easier for the dye 26 to dissolve from the interior surface of the component. The dye may be applied to a component of the low pressure side 28 of the air conditioning unit 20, but dissolution of the dye 26 may take longer because only the lubricating oil is in liquid form and exposure of the lubricating oil to the dye 26 is limited. In either case, once the component is installed and the system 20 is charged, the dye 26 typically dissolves in the lubricant before a leak is suspected, or even before a leak occurs. When a leak is suspected, to determine the location of the leak, the air conditioning unit 20 is illuminated with an ultraviolet lamp, as noted above. There is no need to inject more dye 26, nor is there usually a need to wait for the dye 26 to dissolve and to reach the leak site because the dye 26 begins to dissolve immediately upon charging of the system. If a leak is suspected just after charging the system, then the application of ultraviolet illumination may be delayed for a short period to permit the dye 26 to be dissolved.

A measuring device 32 is used to draw dye 26 from a source, such as bulk source container 34. The dye 26 is preferably in liquid form and may be dissolved or suspended in an oil based carrier such as PAG oil so that the dye 26 and carrier will adhere to or "wet" an interior surface of the component being coated. Provided that the quantity of dye per unit area of the internal surface is not excessive and provided that the dye is applied in an adequately dispersed form, such as a mist of fine droplets, this adhesion may tend to discourage the dye 26 from dripping from the interior surface of the component 24 after the dye 26 is applied. Other carriers may also be used to transport the dye 26.

The measuring device 32 measures and dispenses the dye 26 in a quantity determined by taking into account factors, such as the type of material being coated, the viscosity of the dye, the concentration of the dye, the shape of the component, and the surface area to be coated, the quantity being adjusted according to the results of trial applications. The volume of dye 26 is chosen to tend to provide a sufficient amount of dye 26 to dissolve in the lubricant when the part or assembly is charged with a working fluid, such as a refrigerant. The dissolved dye is then available to indicate a leak site, should a leak occur. It is preferable that the volume of dye 26 be limited to discourage or prevent excess dye 26 from dripping from the component 26 after treatment. For example, a standard one meter long aluminum liquid line of ¼ to ⅜ of an inch diameter requires approximately 0.7 mL of concentrated dye to sufficiently coat its interior surface. If too much dye 26 is applied, then the excess dye will drip from the component and possibly spread to an exterior surface of the component potentially leading to false indications of a leak site.

The location of the application of the dye 26 does not have to coincide with the location of a leak or a potential leak. It is sufficient that an amount of dye 26 be dissolved into the refrigerant/lubricant mix such that it can be expressed at a leak site and detected anywhere within the air conditioning system 20. Similarly, the dye 26 does not necessarily have to coat the interior surface of the component 24 uniformly nor does it need to coat the entirety of the internal surface of the component. An amount of dye 26 sufficient to dissolve and be detected at a leak site is all that is required to be applied to the interior surface. However, it is preferable to apply a more uniform coating over a large proportion of the surface area since such an increase in the interface area of the dye to the charging fluid, namely the refrigerant and lubricant, which will tend to promote more rapid solution of the dye when the system is charged after assembly.

The measured volume is pressurized using a pump 42 having a pressurization chamber. The dye 26 is ejected from the pump 42 into the air conditioning component 24 through a nozzle 36. The nozzle 36 may be used to direct the dye into an opening 40 of the component 24. The dye 26 is preferably formed into a mist by forcing it through an atomization device in the nozzle 36. The dye mist enters the component 24 and coats the interior walls thereof. Because the dye 26 finely coats much of the internal surface of the component 24, it may tend to go into solution rapidly when contacted by the lubricant, as opposed to the relatively slower solution of pellets or wafers of solid dye of significantly greater thickness. That is, dissolution of the dye is a transport phenomenon that is sensitive to the ratio of dye volume to the interface area between the dye and the refrigerant/lubricant mix, and film thickness. In relative terms, solid particles tend to have a lower ratio of surface area to mass, and a higher characteristic thickness than a film misted onto a wall surface.

Surface tension of the dye liquid helps the dye 26 to adhere to the interior surface. To improve adhesion of the dye 26 to the interior surface, the dye 26 may be permitted to dry before assembling the component 24. However, the dye 26 may tend to adhere to the surface in liquid form as well. While it is preferable for the dye 26 to uniformly coat the interior walls of the component, it is only necessary that a sufficient amount of dye 26 be applied to the walls to provide that an adequate amount of dye 26 for subsequent dissolution in the lubricant to permit subsequent indication of the location of a leak site.

The dye 26 may alternatively be gradually poured into the component 24 until the interior surfaces are substantially covered. This method may cause dripping of the dye 26 from another opening 38 of the component 24, or at the opening 40 receiving the dye 26. As noted earlier, if drips are not sufficiently cleaned from the exterior surface of the component 24 false indications of leak sites may occur when the installed component 24 is illuminated with ultraviolet light.

Before injecting, the nozzle 36 is preferably inserted into the opening 40 to limit leaking of the injected dye. The nozzle 36 may also be configured to form a seal with the opening 40 of the component 24. To form a seal with the opening 40, the nozzle may be shaped to press fit in the opening 40. An O-ring, grommet, or other elastic device placed on the end 44 of the nozzle 36 may also improve the seal between the nozzle 36 and the opening 40 to prevent leaking of the injected dye.

Figure 4:
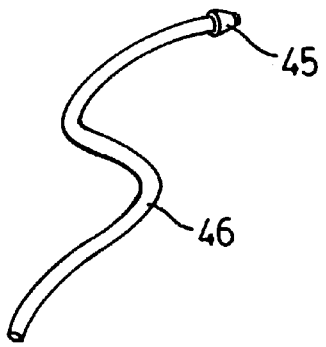
FIG. 4 is a side view of a capillary tube according to an embodiment of the invention.

Referring to FIG. 4, in a further alternative, a probe, or probe-like, instrument having a nozzle 45 mounted at one end, such as a capillary tube, or flexible tube 46, can be introduced into a complex part to enhance internal wall dye coverage.

Injection of the dye 26 may be triggered by a pressure sensitive valve in the nozzle 36 that opens a passageway to the air conditioning component 24 through the nozzle 36 from the pump 42, when the nozzle 36 is forced against the air conditioning component 24. Alternatively, a valve can be placed in the nozzle 36 or inline between the pump 42 and nozzle 36 to be opened by hand or through foot actuation. The nozzle 36 must be designed to avoid injection of dye 26 through inadvertent contact of the nozzle 36 with the air conditioning component 24.

If an air conditioning component has more than one opening, then the injection system may be configured to inject dye 26 into more than one opening. Alternatively, dye may be injected in each of the openings in sequence. Applying modestly chosen amounts of dye 26 through more than one opening may be desirable to avoid having to inject a large amount of the dye 26 through one opening for dispersion all the way through the air conditioning component, with the risk that some excess may emanate from another opening 38 in the air conditioning component and contaminate an exterior surface of the component 24. Injecting dye 26 into more than one opening may also improve the uniformity of the dye coverage throughout the interior of the component 24.

Figure 3:
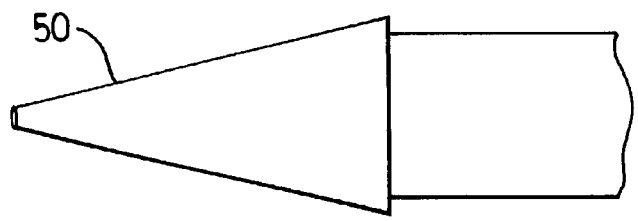
FIG. 3 is a side view of an elongated nozzle according to an embodiment of the invention.

The end 44 of the nozzle 36 may be designed to be inserted completely into the opening 40 of the air conditioning component 24. In such an instance, the end 44 can be inserted to discourage or to avoid drips of dye leaking back from the within the air conditioning component 24 when the nozzle 36 is removed. For example, referring to FIG. 3, the end 44 can be configured as an elongated tip 50 with a maximum diameter smaller than that of the opening 40. In this configuration, the dye 26 is encouraged to drip from the end 44 while the end, 44 is inserted in the opening 40. If dye 26 accumulates around the tip 44 of the nozzle 36 and drips near to the opening 40, the interior of the air conditioning component may have to be wiped through the opening 40 to ensure that no dye 26 leaks back through the opening 40 to contaminate an exterior surface of the component 24.

As noted earlier, for intricate components (not shown), the nozzle may be attached to the end of a extension or lead, such as capillary tube or flexible tube 46, which may be fed into the component to coat interior surfaces that might not be adequately coated using the above method.

A pressurized gas drawn through the pump 42 or a similar device, may be used as a carrier or dispersion agent to improve the distribution of the dye mist to the interior surfaces of the component 24. The gas is mixed with the dye 26 when the dye 26 is injected into the component 24. The gas used is preferably inert to the dye 26 and should be otherwise safe for the intended application. Air, for example, may be used. The preferred combination of dye volume, air volume, and pressure is determined by experimentation for a given air conditioning component. These amounts are chosen to ensure that the dye 26 will be sufficiently coated on the inside surface of the component 24 to permit the dye 26 to be brought into solution with a lubricant when the lubricant is injected into the air conditioning unit 20 during assembly of the unit. The concentration of the dye 26 in solution with the lubricant must be sufficient to indicate leaks when it is forced through any cracks or other faults in the air conditioning unit 20 and illuminated by ultraviolet light. It is advantageous to take care to avoid using an excessive amount of dye that may result in causing excess dye to leak or drip from the air conditioning component 24, including during handling before installation. A fine coating of the component's interior surface is therefore desirable. The dye 26 must not be forced or allowed to leak through any faults or openings 38 in the air conditioning component 24 during injection or any time prior to assembly.

In practice, the components 24 are typically coated by a component manufacturer. The components are then shipped to an original equipment manufacturer (OEM) for assembly into an air conditioning unit 20. It is preferable that the dye 26 not leak from the component during shipping or prior to assembly. As noted above, leaking of the dye may cause an exterior surface of the component to become contaminated with dye leading to false indications of leaks. The present method of pretreating components with dye before assembly does not change the manner in which the OEM assembles or stores the components. The assembly by the OEM is not significantly affected by the dye treatment and the OEM does not have to inject dye into an assembled air conditioning unit 20 if the unit malfunctions. In at least some cases, the OEM may not even be aware that the component 24 has been treated. To test assembled units, the OEM may need only to illuminate a unit after it has been assembled and charged with refrigerant and lubricant. If a leak is suspected by an end-user of the air conditioning unit 20, service personnel may locate the leak using ultraviolet illumination without the need to first inject dye into the system and to wait for the dye to diffuse to the leak site.

Subject to the interior surface area and/or length of the component 24, a pulse of air or other non-reactive gas of predetermined volume may be applied immediately following the injection of the mist. This pulse of air may tend to urge, or drive the mist further into the component 24 thereby enhancing more distant coverage of the interior surface of the component 24. Because air conditioning components tend to be open ended, the predetermination of the volume, or concentration, of the dye and the ensuing pulse of air, should be adjusted to the length and/or surface area of the part to be coated, as discussed above. Otherwise, generally complete and even distribution of the dye 26 will not necessarily be achieved, or excess dye 26 may leak from an opening 38 of the component 24 or both.

Figure 5:
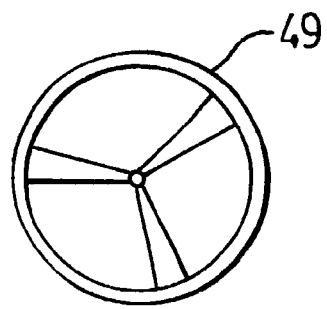
FIG. 5 is an end view of a swirling apparatus according to an embodiment of the invention.
Figure 6:
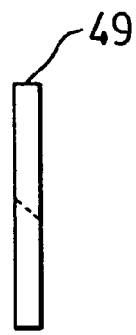
FIG. 6 is a side view of a swirling apparatus of FIG. 5.

Referring to FIGS. 5 and 6, in an alternative embodiment, coverage of the internal wall surface by the dye 26 may also tend to be improved by swirling the dye mist as it is injected into the component 38. To swirl the mist, nozzle 36 may incorporate a swirl vane, such as swirl vane 49 or other device operable to swirl the mist into the component 24 and to direct the dye mist towards the interior surface of the component 24 to produce a more even distribution of the coatings. For example, the mist may be made to swirl by ejecting the dye 26 through a coiled tube in the nozzle 36 or from a rotating, tipping angled tip of the nozzle 36, or another similar swirling device as may be evident to one skilled in the art.

In another alternative embodiment, the present method may include use of an electrostatic process. A charge, such as a positive charge, is applied to the interior surface of the component 24, and an opposite charge, such as a negative charge, is applied to the dye 26. When the dye mist is injected into the component 24, the mist is attracted to the interior surface of the oppositely charged component 24. This improves the adhesion of the dye 26 to the interior surface of the component 24. When using electrostatics to coat the component 26, it is preferable that the nozzle 36 not contact the component 24. If contact is made, then the charge on the component 24 may be lost. To discourage this from occurring, a non-conductive seal 48 may be placed about the perimeter of the nozzle 36 to insulate the nozzle 36 so that the charge on the component 24 is not lost.

The above methods may be used to distribute the dye 26 over a large surface area for quick entry into solution when the dye 26 comes into contact with refrigerant and/or lubricating oil. The method may be used to spread the dye 26 as an oily residue in the air conditioning component 24.

Figure 7:
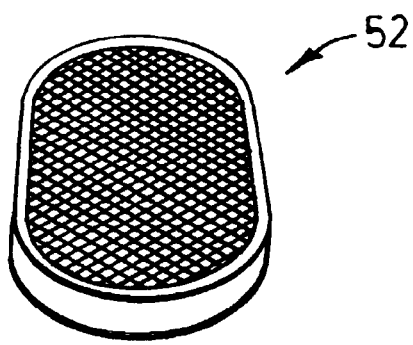
FIG. 7 is a screen according to an embodiment of the invention.

Referring to FIG. 7, an alternative method for applying dye to the internal parts of an air condition system is to pre-coat a screen or filter 52 of the air conditioning system 20 with dye before assembly of the screen or filter 52 into the air conditioning system 20. After the coated filter 52 is installed, the air conditioning system 20 is charged with refrigerant and lubricant which dissolves the dye from the filter and circulates it throughout the air conditioning system 20. As described above, when a leak is formed in the system, the dye is excreted with the lubricant and refrigerant at a leak site, and may be detected using ultraviolet light. This method of applying dye has the advantage that the filter 52 may also be used to filter particulate matter from the air conditioning system 20 to protect the air conditioning components from damage. In particular, the filter 52 may be installed at the point where a liquid line joins the compressor 56 to protect the compressor from damaging grit and other particulates. The filter 52 may also be installed not merely at the time of assembly by the manufacturer, but also after the air conditioning unit 20 is assembled, when, for example, replacement filters are installed. This permits dye to be applied to the system 20 at any time, not just at the time of manufacture. A non-corrosive material, such as stainless steel or a plastic, is preferably used for the filter 52.

It will be understood by those skilled in the art that this description is made with reference to the illustrative embodiments and that it is possible to make other embodiments employing the principles of the invention which fall within its spirit and scope thereof.

What is claimed is:

1. A method of detecting leaks in an air conditioning unit which comprises:
   a. applying an amount of dye to a screen;
   b. installing the screen in a conduit of the air conditioning unit;
   c. injecting refrigerant and lubricant into the air conditioning unit and dissolving dye in the lubricant;
   d. illuminating the air conditioning unit with ultraviolet light; and
   e. checking the illuminated air conditioning unit for fluorescing dye,
   wherein the screen is installed at the point where a liquid line joins a compressor of the air conditioning unit to filter particulates before they enter the compressor.

2. A method of applying dye in liquid form to an interior surface of a component for an air conditioning unit, the method comprising:
   prior to installation of the component,
      a. placing into a measuring device a selected amount of dye; and
      b. dripping said dye into the component to coat at least part of the interior surface of tubing in a component of an air conditioning unit,
   wherein the amounted of dye is selected to limit the possibility that dye will drip from the component.

3. The method of claim 2, wherein the component is an evaporator.

4. The method of claim 2, wherein the component is a condenser.

5. The method of claim 2, wherein the component is an accumulator.

6. The method of claim 2, wherein the component is a receiver-dehydrator.

7. A method of detecting leaks in an air conditioning unit, the method comprising:
   a. prior to installation of a component of the air conditioning unit,
      i. placing a selected amount of a fluorescent dye in liquid form into a measuring device, the amount of dye selected to limit the possibility that the dye will drip from the component; and
      ii. dispensing the dye into an opening of the component to coat an interior surface of tubing in the component;
   b. installing the component in the air conditioning unit;
   c. injecting refrigerant and lubricant into the air conditioning unit to dissolve the dye;
   d. illuminating the air conditioning unit with ultraviolet light; and
   e. checking the air conditioning unit for fluorescing dye.

8. The method of claim 7, wherein the component is an evaporator.

9. The method of claim 7, wherein the component is a condenser.

10. The method of claim 7, wherein the component is an accumulator.

11. The method of claim 7, wherein the component is a receiver-dehydrator.

12. The method of claim 7, wherein the dye is dispensed to evenly distribute the dye over the interior surface of the tubing.

13. The method of claim 7, wherein the component is installed on the high pressure side of the air conditioning unit.

14. The method of claim 7, wherein the dye is mixed with an oil based carrier.

15. The method of claim 7, wherein the dye is dispensed as a mist of fine droplets.

16. The method of claim 7, wherein at least a portion of the dye is carried into the component by a pressurized gas.

17. A The method of claim 7, wherein approximately 0.7 mL of concentrated dye is selected per meter of component tubing.

18. The method of claim 7, wherein dispensing the dye comprises pressurizing the dye with a pump.

19. The method of claim 18, wherein dispensing the dye further comprises passing the pressurized dye through an atomization device to form a mist.

20. The method of claim 7, wherein the dye is permitted to dry before the component is installed.

21. The method of claim 7, wherein the dye is dispensed through a nozzle, and dispensing the dye comprises sealing the nozzle to the opening of the component.

22. The method of claim 21, wherein an elastic device is used between the opening and the nozzle in sealing the nozzle to the component.

23. The method of claim 7, wherein the dye is dispensed through a nozzle that is mounted on a flexible tube for insertion, and dispensing of the dye, into the tubing.

24. The method of claim 7, wherein the component has more than one opening and dye is dispensed into more than one opening.

* * * * *